Figure 1:
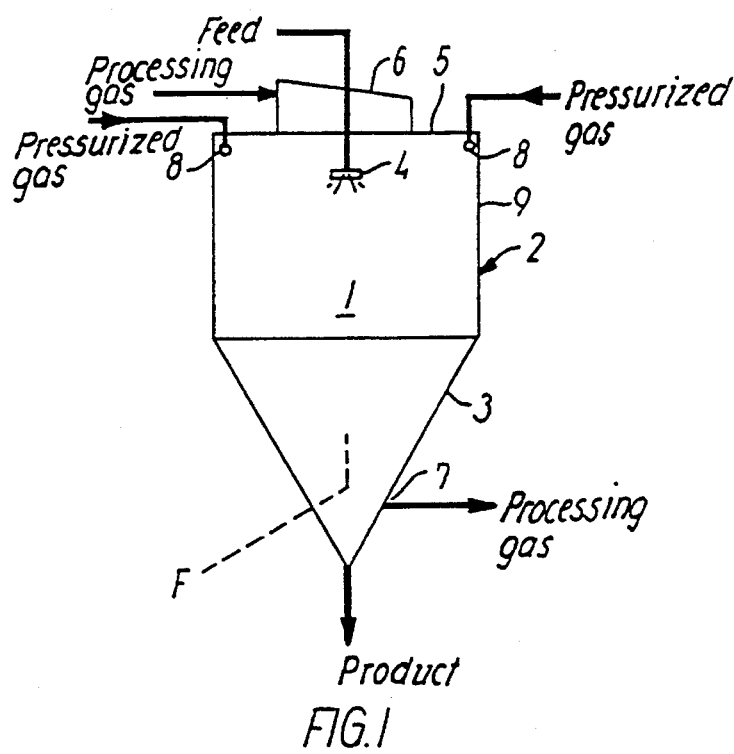

United States Patent [19]

Hansen

[11] Patent Number: 5,596,817
[45] Date of Patent: Jan. 28, 1997

[54] METHOD AND AN APPARATUS FOR MINIMIZING DEPOSITS IN A DRYING CHAMBER

[75] Inventor: Ove E. Hansen, Allerød, Denmark

[73] Assignee: Niro Holding A/S, Soborg, Denmark

[21] Appl. No.: 341,598

[22] PCT Filed: May 19, 1992

[86] PCT No.: PCT/DK93/00170
§ 371 Date: Nov. 21, 1994
§ 102(e) Date: Nov. 21, 1994

[87] PCT Pub. No.: WO93/23129
PCT Pub. Date: Nov. 25, 1993

[30] Foreign Application Priority Data

May 21, 1992 [EP] European Pat. Off. .............. 92610037

[51] Int. Cl.⁶ .................................................. F26B 3/08
[52] U.S. Cl. ................................. 34/373; 34/191; 34/583; 159/4.2; 159/4.08; 159/4.05
[58] Field of Search ............................... 34/373, 337, 380, 34/402, 413, 426, 430, 487, 60, 83, 84, 108, 130, 132, 140, 191, 221, 222, 223, 224, 225, 233; 159/4.01, 4.02, 4.03, 4.04, 48.1, 48.2, 4.2, 4.08, 4.05; 202/236; 203/90; 239/239

[56] References Cited

U.S. PATENT DOCUMENTS

| | | | |
|---|---|---|---|
| 1,634,640 | 7/1927 | Zizinia | 159/4.01 |
| 2,333,333 | 11/1943 | Peebles et al. | 159/4.03 |
| 2,757,956 | 8/1956 | Salminen | 239/239 |
| 3,895,994 | 7/1975 | Saguchi et al. | 159/4.01 |
| 4,809,442 | 3/1989 | Iwaya et al. | 34/373 |
| 5,227,017 | 7/1993 | Tanaka et al. | 159/48.1 |

FOREIGN PATENT DOCUMENTS

| | | |
|---|---|---|
| 0127031 | 12/1984 | European Pat. Off. . |
| 918318 | 7/1949 | Germany . |
| 1014936 | 8/1957 | Germany . |
| 1228567 | 8/1965 | Germany . |
| 474086 | 10/1937 | United Kingdom . |
| 1514824 | 6/1978 | United Kingdom . |

OTHER PUBLICATIONS

K. Masters, "Spray Drying Handbook", 1991, pp. 152, 154.

Primary Examiner—John M. Sollecito
Assistant Examiner—Steve Gravini
Attorney, Agent, or Firm—Sughrue, Mion, Zinn, Macpeak & Seas

[57] ABSTRACT

In a drying or cooling chamber (1) having a mainly cylindrical upper section (2) joining an underlying mainly conical or frusto-conical lower section (3), an inlet (6) for processing gas is provided at the upper end of the cylindrical section (2) and an outlet (7) for the processing gas at the lower or upper end of the chamber. Deposition of products on the inner surfaces of the chamber is minimized by injection by nozzle means (8) of at least one jet of pressurized gas at a high flow velocity but a low flow rate compared to the flow velocity and the flow rate of the processing gas at a level of the cylindrical section (2) remote from the processing gas outlet (7) and at a point close to a circumferential wall (9) of the cylindrical section (2). The jet is injected with a main flow direction substantially tangential and horizontal in respect of the circumferential wall (9) to interact with the flow of the processing gas to increase the flow velocity thereof in a region extending along at least the circumferential wall (9) of the cylindrical section (2) between the injection level and the processing gas outlet.

19 Claims, 2 Drawing Sheets

METHOD AND AN APPARATUS FOR MINIMIZING DEPOSITS IN A DRYING CHAMBER

The present invention relates to a method for minimizing deposition of products on the inner surfaces of a chamber in which a liquid feed is atomized and subjected to the influence of a processing gas to form a granular or particulate product, the chamber being composed of a mainly cylindrical upper section joining an underlying mainly conical or frusto-conical lower section, both with a mainly vertical axis, an inlet for said processing gas being provided at the upper end of the cylindrical chamber section and an outlet for the processing gas being provided at the lower or upper end of the chamber.

In spray drying and spray cooling technology it is a well-known problem that the sprayed material ejected from the atomizing device may have a sticky surface, and a tendency to deposit and accumulate on wall parts of the atomizing chamber, which may be more or less pronounced according to the powder properties such as thermoplasticity, fat content, static electrical or chrystallization properties or simply moisture content.

In the past, various measures have been suggested to counteract this tendency. Electrical or pneumatic hammers or vibrators may be mounted on the chamber wall to constantly dislodge products tending to remain on the wall. The standard textbook K. Masters "Spray Drying Handbook", John Wiley & Sons. Inc., New York, 5th Edition, 1991, pp. 152–154 suggests as additional measures the introduction of a secondary air flow through slots in the lower part of the circumferential wall of the upper cylindrical section of the chamber to sweep the chamber walls or, in more severe cases, the installation of a so-called air broom device, comprising a duct member extending vertically at a short distance from the chamber walls and having a number of air outlets facing the wall. In operation, the air broom device sweeps the chamber walls by a relatively slow rotary movement.

From EP published patent application No. 0 127 031, GB patent Nos. 474 086 and 1 514 824 and U.S. Pat. Nos. 1,634,640, 2,333,333 and 3,895,994, various applications of spraying technology are known, involving the introduction of a secondary air flow in the atomizing chamber to reduce the formation of deposits on the chamber walls.

EP published patent application No. 0 127 031 discloses the use of spray drying for smoke gas cleaning by contacting the hot gas stream containing gaseous impurities with an aqueous medium containing an absorbant for the impurities to produce a gas stream of reduced impurity content and dried powder products. In order to prevent the powder products thus formed from depositing on the chamber walls as a result of insufficient drying, a minor portion of the hot gas stream is withdrawn from the main flow entering the upper part of the atomizing chamber and guided through a bypass duct to a lower portion of the chamber where it is introduced in a direction counter to the direction of swirl of the major portion of the hot gas stream.

According to GB patent No. 474 086, a rotating fluid wall or curtain is maintained around the drying zone of an atomizing chamber by providing a plurality of vertical elongate nozzles to direct a suitable fluid within the chamber.

GB patent No. 1 514 824 discloses a spray drying apparatus in which a flushing gas is introduced in the lower conical part of an atomizing chamber through tangentially directed openings in the wall of the conical part to avoid the production of a cake on the wall of the cone.

U.S. Pat. No. 1,634,640 discloses a spray processing apparatus in which objectionable contact of the treated material with the walls of the processing chamber is prevented by providing a circumferential continuous sheet of gas moving along the inner walls of the drying chamber from a number of narrow circumferential openings or slots located above each other, each slot being defined by upper and lower ends of overlapping sheet metal rings.

In U.S. Pat. No. 2,333,333 a desiccating apparatus is disclosed in which additional drying gas is introduced tangentially into the conical lower portion of an atomizing chamber.

U.S. Pat. No. 3,895,994 discloses a method of minimizing the deposit of products on the wall of the cylindrical section of an atomizing chamber by introducing tangential cool air currents from inlets arranged around the discharge end of the cylindrical section so as to swirl within the cylindrical section to produce counter-currents enveloping the main flow of gas.

From a structural point of view, the wall sweep methods and devices disclosed in the above-mentioned references require openings in the wall of the cylindrical or conical chamber section for introduction of the secondary air flow producing the wall sweep action. The provision of such openings and the associated duct system complicates the design of the atomizing chamber. Moreover, the introduction of the secondary air flow in counter-current with the main flow of the processing gas may compromise the desired effect of the latter in an undesired way.

It is the object of the invention to provide a simple and efficient method and apparatus for minimizing deposition of products on the walls of a chamber by which the chamber walls can be maintained substantially free of desposits for a wide range of applications.

According to the invention a method as defined hereinbefore is characterized in that at least one jet of pressurized gas is injected at a site of injection, at a level of said cylindrical section remote from said processing gas outlet and close to a circumferential wall of said cylindrical section, said jet having a high flow velocity compared to the flow velocity of the processing gas at the site of injection, but a low flow rate compared to the flow rate of said processing gas and being injected with a main flow direction substantially tangential and horizontal in respect of said circumferential wall to interact with the flow of said processing gas to increase the flow velocity of said processing gas in a region extending along at least said circumferential wall of the cylindrical section between said level and said processing gas outlet.

The invention also relates to a chamber, including feed means for supplying a liquid feed to an atomizing device arranged in the chamber for receiving and atomizing said feed into an atomizing zone of the chamber and gas supply and distribution means for directing a flow of processing gas to said atomizing zone, said chamber being composed of a mainly cylindrical upper section and an underlying mainly conical or frusto-conical lower section both with a mainly vertical axis, a processing gas inlet of said gas supply and distribution device being provided at the upper end of said cylindrical section and an outlet for processing gas being provided at the lower or upper end of the chamber. According to the invention such a chamber is characterized in that nozzle means is arranged close to the circumferential wall of said cylindrical section at a level remote from said processing gas outlet for injecting a jet of pressurized gas at a high flow velocity compared to the flow velocity of the processing gas at the site of said nozzle, but a low flow rate compared to the flow rate of said processing gas and with a main flow direction substantially tangential and horizontal in respect of said circumferential wall to interact with the flow of said processing gas to in-crease the flow velocity thereof in a region extending at least over said circumferential wall between said level and said processing gas outlet.

By the injection of the jet of pressurized gas to interact with the flow of processing gas in the defined way, a surprisingly efficient sweeping of the chamber wall can be obtained without complicating the structure of the atomizing chamber or comprimising the desired processing function.

Figure 2:
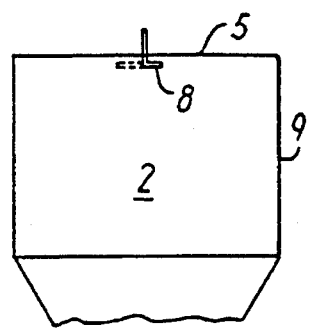
Figure 3:
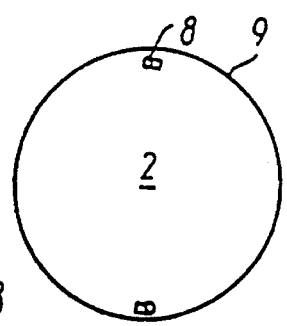

In the following the invention will be further explained with reference to the schematical drawings in which FIGS. 1–3 and 4–6, respectively illustrate two alternative embodiments of an atomizing chamber with nozzle means for injecting a jet of pressurized gas in accordance with the invention; and FIGS. 7 and 8 an embodiment of nozzle means for use in an atomizing chamber as shown in FIGS. 1–3;

In FIGS. 1–3 a chamber 1 is shown schematically which is composed of a mainly cylindrical section 2 and an underlying mainly conical section 3 having the same vertical axis as the cylindrical section 2. A liquid feed is supplied by means known in the art to an atomizing device 4, such as an atomizing wheel or disc or a nozzle arranged in the upper part of the cylindrical section 2 at a short distance below the ceiling 5 of the chamber. The lower section 3 may have a different shape than shown in the Figure, such as a rather flat bottom with a cone angle approaching 180°.

A processing gas, such as a drying gas is supplied to the chamber 1 through a gas distributor 6 arranged above the ceiling and projecting below the ceiling 5 in a manner not illustrated towards the processing gas outlet surrounding the atomizing device 4. A suitable type of gas distributor for use in the spray drying of products to obtain a uniform distribution of processing gas in a drying zone beneath the atomizing device would be the gas distributing device disclosed in U.S. Pat. No. 4,227,896.

An outlet 7 for the processing gas G is provided in the lower part of the conical section 3.

The dashed line F illustrates an alternative way of supplying the feed to the chamber 1.

In the embodiment shown, two nozzles 8 for supplying jets of pressurized gas are arranged substantially opposite each other in a corner region between the ceiling 5 and the circumferential wall 9 of the cylindrical section 2.

As further described in the following with reference to FIGS. 7 and 8, each nozzle 8 is generally formed as a bent tubular member suspended in the ceiling 5, and having a main flow direction of injection substantially tangential and horizontal in respect of the circumferential wall 9.

According to the invention the jets of pressurized gas are injected at a high flow velocity and a low flow rate compared to the flow velocity and the flow rate of the processing gas.

The high flow velocity is obtained by injection through a nozzle of pressurized gas at an overpressure which may be in the range from 1 to 10 bar, whereas the volumetric flow rate will preferably be in the range from 3 to 20 per cent of the supply flow rate of the processing gas.

When the processing gas is a drying gas it is further preferred to subject the pressurized gas to pre-heating to ensure that no condensation of vapours occurs on the inner wall of the chamber. The inlet temperature of the pressurized gas may be well below that of the drying gas.

As further described in the following, the effect of the injection of the jet or jets of pressurized gas is to interact with the flow of processing gas to supply kinetic energy to the processing gas flow and increase the flow velocity of the processing gas in a region extending along the circumferential wall 9 of the cylindrical section 2 and possibly along a part of the conical section 3 between the nozzles 8 and the processing gas outlet 7.

Figure 7:
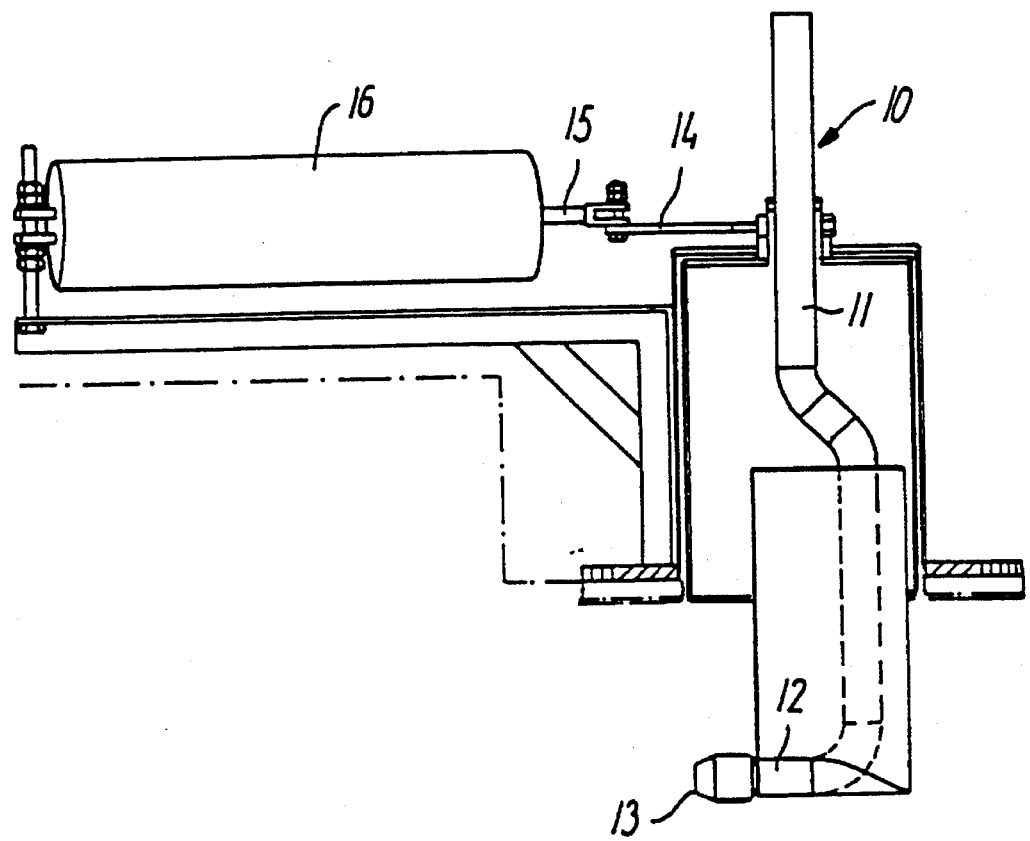
Figure 8:
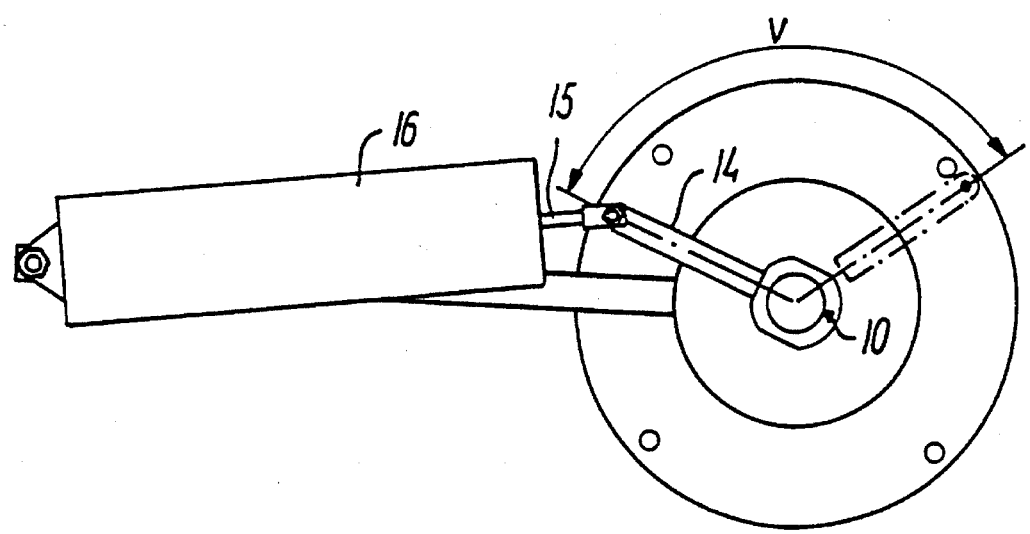

As shown in FIGS. 7 and 8 each nozzle 8 may be formed as a tubular element 10, composed of a mainly vertical first section 11 suspended in a bearing in the ceiling 5, and a mainly horizontal second section 12 bent at right angles at the lower end of the first section 11 and having a nozzle mouth piece 13 attached to its free end.

In order to provide a possibility for additional sweeping of the underside of the ceiling 5, the vertical section 11 of the nozzle 10 may be connected with a first end of an actuating lever 14, the other end of which is pivotally connected with the working member of a hydraulic or pneumatic motor, such as the working piston 15 of a hydraulic cylinder 16 for producing a reciprocating rotary movement immediately below the underside of the ceiling 5. Depending on the actual need, the angular range v of this sweeping movement may be from 10° to 120°, and the sweeping, which may last for a few seconds only, may preferably be performed intermittently at intervals of for instance 1–5 minutes, interrupting the above-described sweeping of the circumferential wall.

Figure 4:
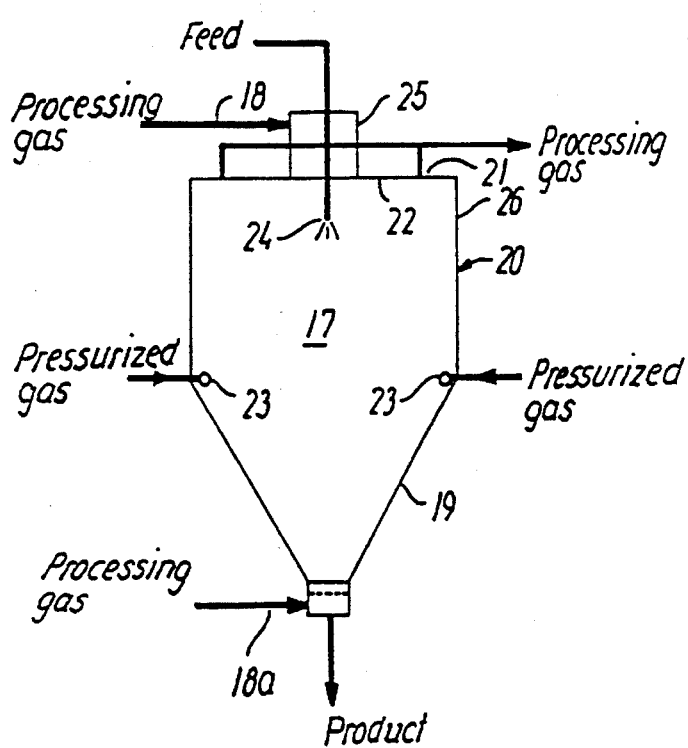
Figure 5:
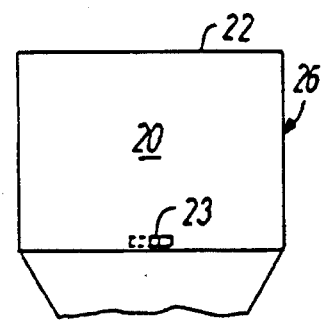
Figure 6:
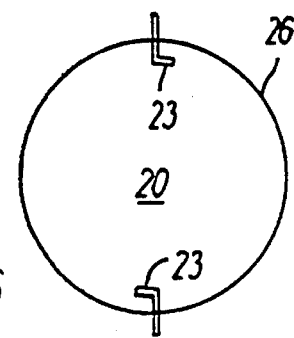

In FIGS. 4–6 an alternative embodiment is illustrated, in which the chamber 17, in addition to a main processing gas inlet 18, has a gas inlet 18a in the conical section 19, e.g. at the bottom thereof, to provide a fluidized bed, whereas a processing gas outlet 21 is provided in the upper part of the cylindrical section 20, e.g. in the ceiling 22. In order to dispose the level of introduction of the jet or jets of secondary air to a point remote from the processing gas outlet 21, the nozzle 23 may in this case be arranged above the fluidized bed at the transition between the conical and cylindrical chamber sections 19 and 20.

The atomizing device 24 may be a nozzle, and the gas distributor 25 may be designed and arranged similarly to the description above for the embodiment of FIGS. 1–3.

Each nozzle 23 is formed and arranged to inject the jet of gas with a main flow direction which is substantially horizontal and tangential in respect of the circumferential wall 26 of the cylindrical section 20.

The effect of the injected jet of pressurized gas in raising the flow velocity of the processing gas in the region along the circumferential wall of the cylindrical chamber section with a nozzle arrangement as shown in FIGS. 1–3 have been verified by computer simulation using the software FLUENT supplied by Fluent Inc., Hanover, N.H., USA (formerly Creare.X Inc.).

Analysis of stream function contours and distribution of tangential rotational velocity in horizontal planes for a chamber without application of the method and apparatus according to the invention has revealed that a strong vortex formation occurs in the upper part of the cylindrical chamber section around the atomizing device with a tangential rotational velocity along the circumferential wall between 1 and 2 meters per second.

By simulated application of the method and apparatus according to the invention to the same chamber under equal operating conditions, the analysis revealed that the tangential rotational velocity at the circumferential wall had increased to 7 to 8 m/s. The simulation analysis thus verify that a significant in crease has been obtained in this region compared to the rotational velocity in the part of the chamber between this region and the main processing zone of the chamber.

As a further verification of the advantages obtained by the invention, reference is made to the following examples of the results of experimental tests of the invention.

EXAMPLES

Tests were performed in a spray drying chamber with a diameter of 2.67 m, a cylindrical height of 1.95 m and a 60° cone angle.

Drying air entered the chamber through a ceiling air disperser and left the chamber together with the product through an outlet in the cone bottom.

Atomization was performed by means of a rotary atomizer equipped with an atomizer wheel with a diameter of 150 mm.

A nozzle for injection of pressurized gas according to the invention with a hole diameter of 10 mm was installed in the corner region between the ceiling and the wall.

1. Test-drying of an aqueous solution of meat extract, a product which, when dried to a powder, is hygroscopic, thermoplastic and easily becomes charged with static electricity.

Operating conditions were as follows:

| | |
|---|---|
| Atomizer wheel | 23000 Rpm |
| Drying air rate | 2200 kg/h |
| Drying air inlet temperature | 180° C. |
| Drying air outlet temperature | 90° C. |
| Drying air/jet air weight ratio | 1:0.05 |
| Jet air pressure | 3 bar g |
| Jet air temperature | 50° C. |

Two tests under identical conditions were performed. The first test was performed without jet air, and deposits occurred on the walls and ceiling of the chamber, whereas the second test performed with the jet air according to the invention resulted in a chamber totally free from deposits.

2. Test-drying of a solution of hydrolyzed vegetable protein, also a product which in powder form is hygroscopic and thermoplastic.

Operating conditions were as follows:

| | |
|---|---|
| Atomizer wheel | 20000 Rpm |
| Drying air rate | 1940 kg/h |
| Drying air inlet temperature | 180° C. |
| Drying air outlet temperature | 110° C. |
| Drying air/jet air weight ratio | 1:0.07 |
| Jet air pressure | 4 bar g |
| Jet air temperature | 50° C. |

A chamber totally free from deposits was achieved which is surprising for this product which normally requires a so-called wall sweep device or an air broom device.

3. It is well known that it is difficult to produce honey powder because it is syrupy and sticky. Even when mixed with inert carriers, e.g. cyclodextrine, such as described in Japanese patent application No. JP 60186256, spray drying is connected with serious problems of deposits.

A similar honey product was spray dried in three tests as follows:

a) In the first test, the feed was spray dried without any particular means for minimizing deposits in the drying chamber. This resulted in a completely unacceptable amount of deposits in the chamber.

b) The second test was performed with a known air broom device installed in the drying chamber.

c) The third test was performed using the jet air according to the invention.

Operating conditions were as follows:

| | |
|---|---|
| Atomizer wheel | 20000 Rpm |
| Drying air rate | 1780 kg/h |
| Drying air inlet temperature | 160° C. |
| Drying air outlet temperature | 85° C. |
| Drying air/air broom air weight ratio | 1:0.32 |
| Air broom air temperature | 62° C. |
| Drying air/jet air weight ratio | 1:0.10 |
| Jet air pressure | 4.8 bar g |
| Jet air temperature | 60° C. |

In the tests b) and c), a layer of some deposits occurred in the chamber, which was expected. Approximately the same amount of deposits was observed after these runs.

However, the plant with nozzle means according to the invention is superior to the known air broom device due to its much more handy construction and the lower air flow rate used.

Whereas in the embodiments of FIGS. 1–6 two nozzles 8 are arranged in diametrically opposite positions for the injection of two jets of secondary pressurized air, which is suitable for larger chamber dimensions, only one nozzle may be sufficient at a smaller size of the atomizing chamber. Moreover, the nozzle need not be stationary in respect of the chamber but may be suspended to move in a circular path following the circumferential wall of the cylindrical chamber section at a moderate velocity, such as known in principle from the so-called air broom sweeping method.

I claim:

1. A method for minimizing deposition of products on the inner surfaces of a chamber (1, 17) in which a liquid feed is atomized and subjected to the influence of a processing gas to form a granular or particulate product, the chamber being composed of a mainly cylindrical upper section (2, 20) joining an underlying mainly conical or frusto-conical lower section (3, 19), both with a mainly vertical axis, an inlet (6, 18) for said processing gas being provided at the upper end of the cylindrical chamber section and an outlet (7, 21) for the processing gas being provided at the lower or upper end of the chamber, an auxiliary gas flow being further introducing into the chamber to reduce deposition of products on the walls of the chamber characterized in that the auxiliary gas flow is injected in the form of at least one jet of pressurized gas at a site or sites of injection, at the end of said cylindrical section (2, 20) which is most remote from said processing gas outlet (7, 21) and close to a circumferential wall (9, 26) of said cylindrical section, said at least one jet having a high flow velocity compared to the flow velocity of the processing gas at the site of injection, but a total flow rate of all jets which is low compared to the flow rate of said processing gas and being injected with a main flow direction which is horizontal and substantially tangential with respect to said circumferential wall (9, 26) to interact with the flow of said processing gas to supply kinetic energy thereto so as to increase the flow velocity of said processing gas in a region extending along at least said circumferential wall (9, 26) of the cylindrical section between said level and said processing gas outlet (7, 21).

2. A method as claimed in claim 1, characterized in that said processing gas inlet (6) is disposed in a ceiling (5) of the cylindrical chamber (2) section whereas said outlet (7) is disposed in said conical or frusto-conical section (3), respectively, said at least one jet being injected in a corner region between said ceiling (5) and said circumferential wall.

3. A method as claimed in claim 2, characterized in that the injection of said jet in said main direction is performed in first time intervals of a relatively long duration interrupted by relatively short second time intervals in which the flow direction of the jet is turned reciprocating within a prescribed angular range to interact with the flow of processing gas in a region covering a substantial part of the underface of said ceiling (5).

4. A method as claimed in claim 1 applied to a chamber in particular of the type with an integrated fluid bed, in which said processing gas outlet (21) is disposed in or close to a ceiling (22) of said cylindrical chamber section (20), characterized in that said jet or jets are injected at the end of said cylindrical section (20) adjacent said conical (19) section.

5. A method as claimed in claim 1, characterized in that the gas pressure of each jet exceeds that of the processing gas at the site of injection by 1 to 10 bar whereas the total flow rate of the at least one jet is between 3 and 20 per cent of the supply flow rate of the processing gas.

6. A method as claimed in claim 1, wherein said processing gas is a drying gas, characterized in that said jet is preheated to a temperature well below that of said drying gas.

7. An atomizing chamber, including feed means for supplying a liquid feed to an atomizing device (4, 24) arranged in the chamber (1, 17) for receiving and atomizing said feed into an atomizing zone of the chamber and gas supply and distribution means (6, 25) for directing a flow of processing gas to said atomizing zone, said chamber being composed of a mainly cylindrical upper section (2, 20) and an underlying mainly conical or frusto-conical lower section (3, 19) both with a mainly vertical axis, a processing gas inlet (6, 25) of said gas supply and distribution means being provided at the upper end of said cylindrical section and an outlet (7, 21) for processing gas being provided at the lower or upper end of the chamber, means being further provided for introduction an auxiliary gas flow into the chamber to reduce deposition of products on the walls of the chamber, characterized in that said auxiliary gas introduction means comprises at least one nozzle means (8, 23) arranged at the end of said cylindrical section (2, 20), which is most remote from said processing gas outlet, and close to the circumferential wall (9, 26) of said cylindrical section for injecting at least one jet of pressurized gas, said auxiliary gas introduction means further including means for maintaining a high flow velocity of each jet at the site of said nozzle means, but a total flow rate of all jets which is low compared to the flow rate of the processing gas and being arranged to impart to said jet a main flow direction which is horizontal and substantially tangential with respect to said circumferential wall (9, 26) so as to cause said jet to interact with the flow of said processing gas to supply kinetic energy thereto so as to increase the flow velocity thereof over said circumferential wall (9, 26) at least in a region extending between said end of the cylindrical section and said processing gas outlet (7, 21).

8. A chamber as claimed in claim 6, characterized in that said processing gas inlet (6) is disposed in a ceiling (5) of the cylindrical cheer section (2), whereas said outlet (7) is disposed in the lower part of the conical or frusto-conical section (3), respectively and said nozzle means (8) is arranged in a corner region between said ceiling (5) and said circumferential wall (9).

9. A chamber as claimed in claim 8, characterized in that said nozzle means (8) is suspended in said ceiling (5) for reciprocating rotary movement within a prescribed angular range and is coupled with intermittently operated drive means for effecting said reciprocating rotary movement.

10. A chamber as claimed in claim 9, characterized in that said nozzle means comprises a tubular element (10) composed of a mainly vertical first section (11) suspended in bearing means in said ceiling and a mainly horizontal second section (12) at the lower end of said first section (11), a nozzle mouth piece (13) being attached to a free end of said second section.

11. A chamber as claimed in claim 10, characterized in that a part of said first section (11) extending outside the chamber is connected with one end of an actuating lever (14), the other end of which is pivotally connected with the working member (15) of a hydraulic or pneumatic actuating device (16) for producing said reciprocating rotary movement.

12. A chamber as claimed in claim 8 wherein said processing gas is a heated drying gas, characterized in that heating means is provided for preheating said jet to a temperature well below that of said processing gas.

13. A chamber as claimed in claim 9 wherein said processing gas is a heated drying gas, characterized in that heating means is provided for preheating said jet to a temperature well below that of said processing gas.

14. A chamber as claimed in claim 8 characterized in that said nozzle means is suspended to perform a circular sweeping movement in a plane around said common vertical axis.

15. A chamber as claimed in claim 9 characterized in that said nozzle means is suspended to perform a circular sweeping movement in a plane around said common vertical axis.

16. A chamber as claimed in claim 6, wherein air supply and distribution means (18a) is provided in the conical chamber section (19) for producing a fluidized bed, said processing gas outlet (21) being disposed in the upper part of said cylindrical section (20), characterized in that said nozzle means (23) is arranged above said fluidized bed at the end of said cylindrical (20) section adjacent said conical (19) section.

17. A chamber as claimed in claim 6, wherein said processing gas is a heated drying gas, characterized in that heating means is provided for preheating said jet to a temperature well below that of said processing gas.

18. A chamber as claimed in claim 17 characterized in that said nozzle means is suspended to perform a circular sweeping movement in a plane around said common vertical axis.

19. A chamber as claimed in claim 6, characterized in that said nozzle means is suspended to perform a circular sweeping movement in a plane around said common vertical axis.

* * * * *